United States Patent [19]

Hitney

[11] 4,093,918

[45] June 6, 1978

[54] MEANS FOR DETERMINING THE REFRACTIVE INDEX PROFILE OF THE ATMOSPHERE

[75] Inventor: Herbert V. Hitney, San Diego, Calif.

[73] Assignee: The United States of America as represented by the Secretary of the Navy, Washington, D.C.

[21] Appl. No.: 714,868

[22] Filed: Aug. 16, 1976

[51] Int. Cl.² .............................................. H04B 17/00
[52] U.S. Cl. .................................................... 325/67
[58] Field of Search ....................... 325/65, 67, 1, 2, 4, 325/5, 6, 14

[56] References Cited

PUBLICATIONS

A Computer-Aided System for Scaling Topside Ionograms – Lockwood, Proceedings of the IEEE, vol. 57, No. 6, Jun. 1969, pp. 986–989.
Effects of Precipitation on 15.3 and 31.65 GHz Earth Space Transmissions With ATS-V Satallite – Ippolitto, Proc. of IEEE, vol. 59, No. 2, Feb. 1971 pp. 189–205.
Microwave Repeater Research – 1948 – pp. 8–11 "Atmospheric Refraction" H. T. Friis, Bell Telephone System Technical Publication.

*Primary Examiner*—Benedict V. Safourek
*Assistant Examiner*—Michael A. Masinick
*Attorney, Agent, or Firm*—R. S. Sciascia; G. J. Rubens; T. M. Phillips

[57] ABSTRACT

In a method for inferring the refractive index profile of the lower atmosphere a signal pattern comprising interference nulls is observed by receiving a signal from a satellite transmitter over a period of time. Hypothetical signal patterns are successively calculated by hypothesizing the validity of different refractive index profiles and compared with the observed signal pattern until one of them matches the observed signal pattern to within a selected limit of error.

6 Claims, 5 Drawing Figures

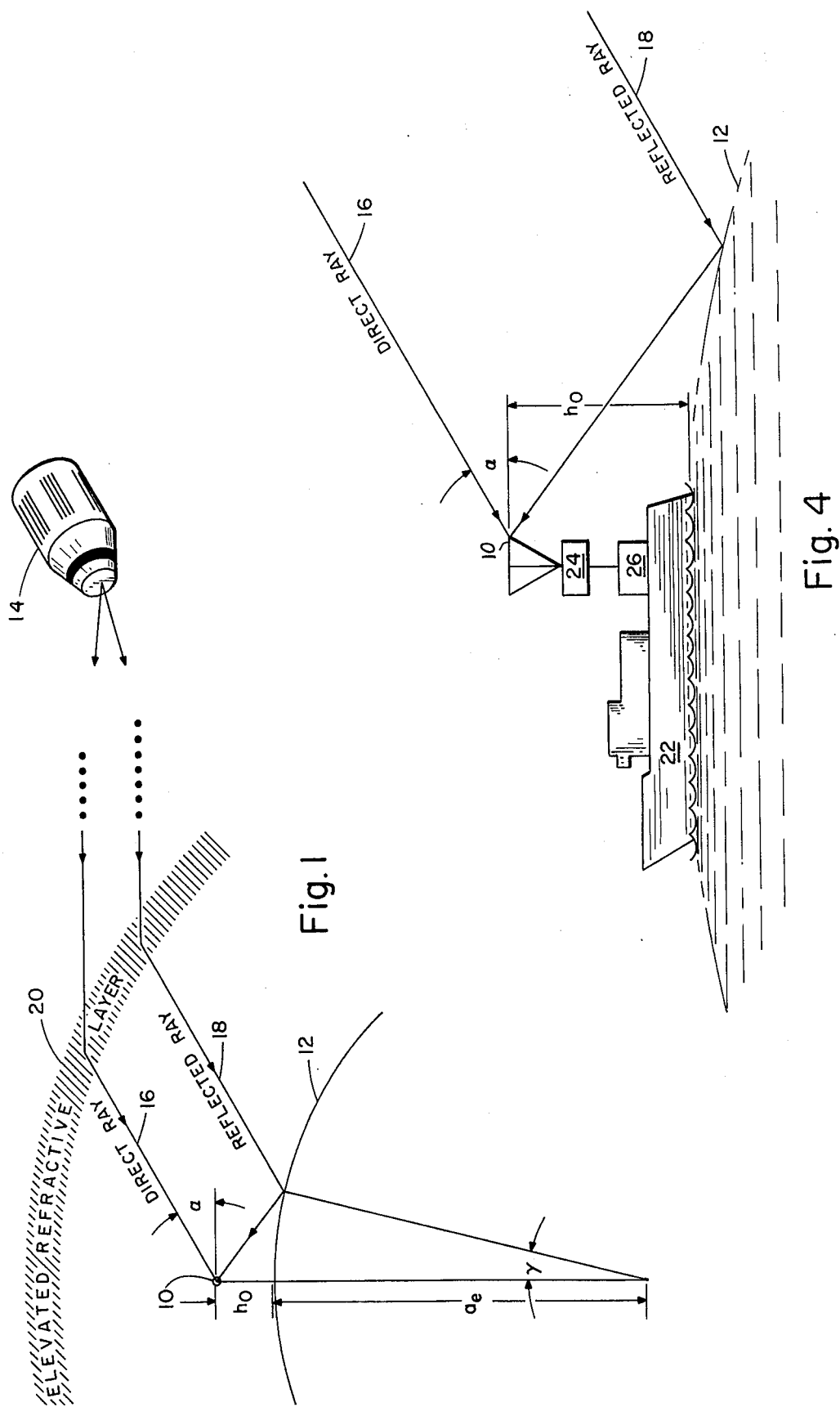

MEANS FOR DETERMINING THE REFRACTIVE INDEX PROFILE OF THE ATMOSPHERE

BACKGROUND OF THE INVENTION

The present invention pertains to a means for inferring the refractive index profile of the atmosphere and particularly to such means wherein an observed signal pattern is compared with a succession of hypothetical signal pattern models.

A precise knowledge of the refractive index profile of the atmosphere, which may comprise the atmospheric refractive index as a function of height, is important for accurately and reliably predicting the transmission of information through the atmosphere. For accurate transmission at VHF and higher frequency ranges (30 MHz-30 GHz) it is particularly important to have an accurate refractive index profile of the lower atmosphere (up to 20,000 feet). In addition, for certain applications it may be necessary to be able to quickly determine the "real" refractive index profile, which is the actual profile in a specified area at a specified point in time, rather than relying on a time-averaged "standard" refractive index profile, which may be quite different for the specified time. For example, for certain military applications the accuracy of the refractive index profile may be critical in planning operations where it is sought to evade hostile radar.

The calculation of the refractive index profile using prior art methods requires the use of balloons and radiosondes or aircraft carrying microwave refractometers. Each of these methods is relatively expensive, time-consuming (requiring a minimum of forty-five minutes) and requires substantial logistic support. Use of the radiosonde entails further disadvantage for military purposes since it transmits a signal which may be detected by a hostile receiver.

Further prior art means for determining a refractive index profile employs the principle of doppler shift in a satellite signal. However, such means require the use of a satellite transmitter having a higher stability than is presently used in satellite transmitters.

SUMMARY OF THE INVENTION

The present invention enables an observer to passively and quickly (within three minutes) infer the refractive index profile of the lower atmosphere at a specified point in time and valid within a radius of several hundred kilometers of his position. The invention is particularly useful for certain military and naval applications, for example, for determining the coverage of friendly as well as hostile radars. However, it is anticipated that the present invention may have a wide range of other applications in the transmission, and prediction of transmission, of information through the atmosphere.

To infer a refractive index profile according to the present invention a signal is received from a satellite transmitter as the satellite moves through low elevation angles. The observed signal pattern, or plot of received signal strength vs. satellite position is comprised of interference nulls. For a signal of specified frequency, hypothetical signal patterns may be calculated by determining the numerical value of elevation angle at each interference null for different hypothesized refractive index profiles. Each hypothetical signal pattern is successively compared with the observed signal pattern until one of them matches the observed pattern to within a selected limit of error. It may then be inferred that the hypothesized profile of the matching hypothetical signal pattern is the refractive index profile for the time and location at which the signal is received. Suitably programmed data processing means may be employed for calculating each hypothetical signal pattern and for comparing it with the data of the observed signal pattern.

STATEMENT OF THE OBJECTS OF THE INVENTION

An object of the invention is to provide a new and improved means for determining the refractive index profile of the atmosphere.

Another object of the invention is to provide a new and improved means for determining the refractive index profile of the lower atmosphere within a very short period of time.

Another object of the invention is to provide a new and improved means for enabling an observer to passively determine the refractive index profile of the lower atmosphere for his general vicinity.

Other objects, advantages and novel features of the invention will become apparent from the following detailed description of the invention when considered in conjunction with the accompanying drawings.

BRIEF DESCRIPTION OF THE DRAWINGS

FIG. 1 is a diagram illustrating the basic principles of the invention.

FIG. 4 shows the manner in which the invention may be employed aboard a vessel.

DESCRIPTION OF THE PREFERRED EMBODIMENT

Figure 3:
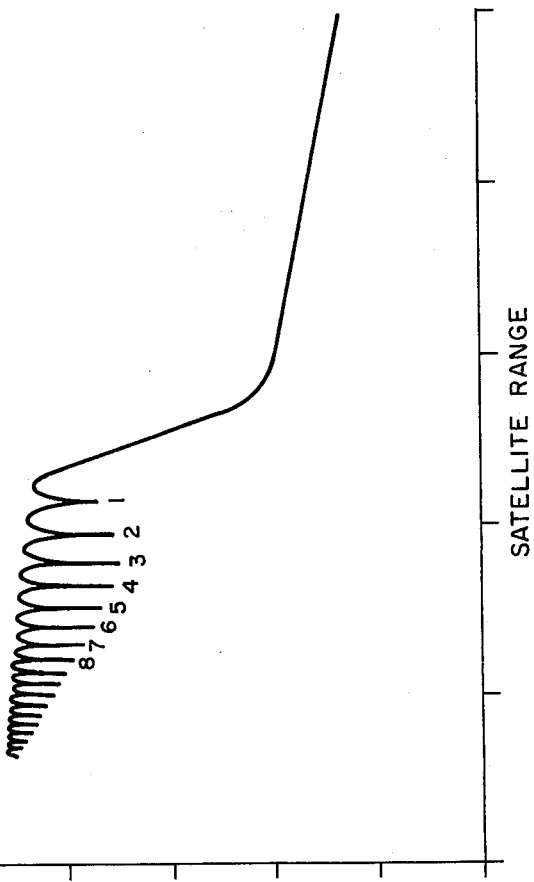
FIG. 3 is a graph showing a signal pattern.

To more fully illustrate the basic principles of the invention, which are well known in the art, reference is made to FIG. 1, wherein a signal from satellite transmitter 14 may be observed at a point 10, which is located at a selected height $h_o$ above reflecting surface 12. The signal observed at point 10 comprises the sum of direct signal ray 16 which is received directly from transmitter 14 and reflected signal ray 18 which is reflected to point 10 by reflecting surface 12. Within the lower atmosphere direct ray 16 and reflected ray 18 may be assumed to have parallel paths up to the point of contact with surface 12, and the difference in the respective path lengths of ray 16 and 18 from transmitter 14 to point 10 may be represented by an algebraic symbol, $d$. Rays 16 and 18 are equally refracted by the lower atmosphere, which is represented in FIG. 1 by elevated refractive layer 20. The symbols $\alpha$, $a_e$, and $\gamma$ in FIG. 1 are algebraic symbols representing the following quantities:

$\alpha$ = elevation angle of satellite transmitter 14
$a_e$ = effective earth radius based on lowest segment of hypothesized refractive index profile
$\gamma$ = central angle.

Figure 2A:
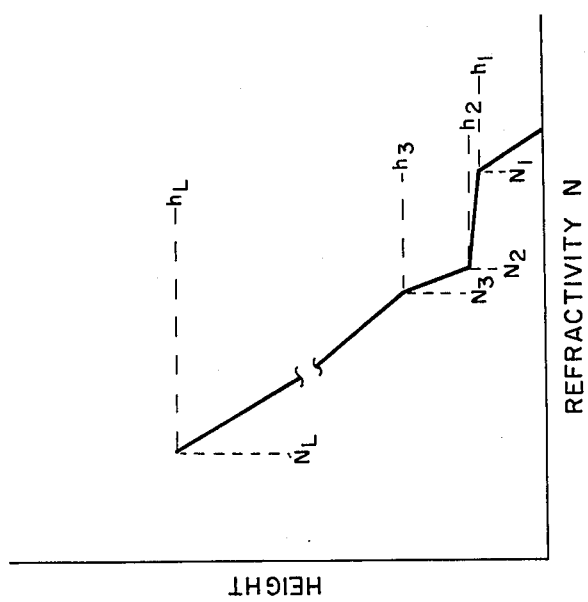
FIG. 2a is a graph showing a linearly segmented refractivity profile.
Figure 2B:
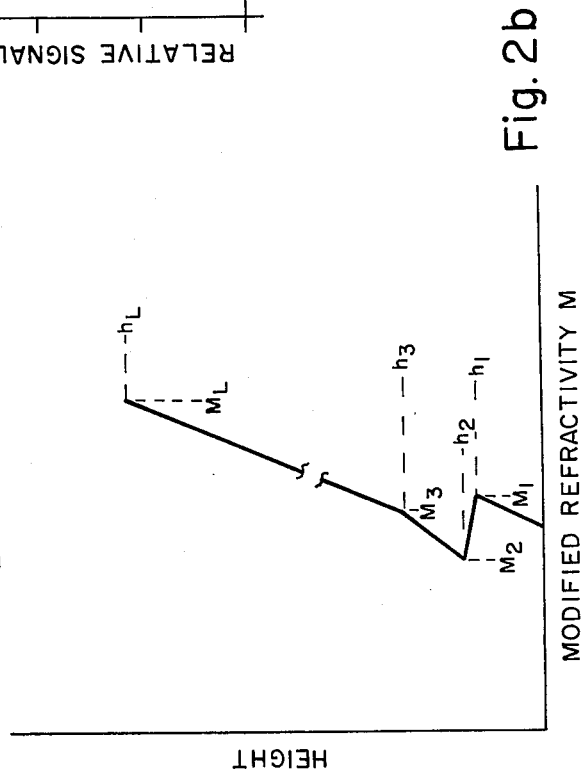
FIG. 2b is a graph showing a linearly segmented modified refractivity profile.

To further define quantity $a_e$, reference may be made to FIGS. 2a and 2b, which show a linearly segmented profile of refractivity N vs. height, and a linearly segmented profile of modified refractivity M vs. height, respectively. Refractivity N of FIG. 2a is equal to $(n-1) \times 10^6$, where $n$ is the actual refractive index of the atmosphere, and modified refractivity M of FIG. 2b is equal to $N + h/a \times 10^6$, where $h$ is height above surface 12 and $a$ is the true radius of the earth. In FIGS. 2a and 2b L represents the total number of linear segments in the respective profiles and each quantity $h_j$ represents the height at the top of linear segment $j$. $N_j$ and $M_j$ represent the refractivity and modified refractivity, respectively, at the top of each linear segment for their profiles. If $M_o$ represents modified refractivity at height $h_o$ and $h_o < h_1$, then $a_e = 10^6 \times (h_1 - h_o)/(M_1 - M_o)$.

As satellite transmitter 14 moves through low elevation angles (less than 2°) signal strength minima, or interference nulls, periodically occur at point 10, each interference null resulting from interference between direct signal ray 16 and reflected signal ray 18. According to well known principles the first null occurs when path length difference $d$ is equal to a quantity D, to be defined, and each null thereafter has a path length difference $d = D + i\lambda$ where $i$ is the $i^{th}$ null, and $\lambda$ is the wavelength of the signal from transmitter 14. For specified values of $h_o$ and $\lambda$ and for an $a_e$ obtained by hypothesizing the validity of a particular refractive index profile, the numerical value of $\alpha_{i,o}$, the elevation angle of the $i^{th}$ interference null at point 10 may be calculated by employing the following equations:

$$\gamma = \sqrt{(\alpha_{i,o}/3)^2 + 2h_o/3a_e} - \alpha_{i,o}/3 \quad (1)$$

$$d = D + i\lambda = 2\sqrt{h^2_o + a_e(a_e + h_o)\gamma^2}(\alpha_{i,o} + \gamma)^2 \quad (2)$$

The value of D is determined by the presence and structure of a surface-based duct, which may have a trapping effect on the signal below some critical elevation angle $\alpha_c$ defined as $\alpha_c = \sqrt{2} \times 10^{-6}(M_o - M_m)$ where $M_o$ is the value of modified refractivity at height $h_o$ and $M_m$ is the value of modified refractivity at the top of the surface-based duct. For the case where $M_o \leq M_m$, $D = 0$. For the case $M_o > M_m$, D has a value equal to the integer multiple of $\lambda$ that is just less than $d_c$, where $d_c$ is the path length difference $d$ at which $\alpha_c$ occurs, which may be calculated from equations (1) and (2).

The numerical value of range $R_i$, the distance between point 10 and transmitter 14 for the $i^{th}$ interference null, may be calculated for specified values of $h_o$, $\gamma$, $\lambda$ and $a_e$ by employing the following equations:

$$\alpha_{i,j} = \sqrt{\alpha^2_{i,j-1} + 2K_j(h_j - h_{j-1})} \quad (3)$$

$$R_{i,j} = (\alpha_{i,j} - \alpha_{i,j-1})/K_j \quad (4)$$

$$R_i = \sum_{j=1}^{L} R_{i,j} \quad (5)$$

where $K_j = 10^{-6}(M_j - M_{j-1})/(h_j - h_{j-1})$ and $\alpha_{i,j}$ the elevation angle at height $h_j$.

Referring to FIG. 3 there is shown a signal pattern, or plot of signal strength vs. satellite range, which comprises a number of interference nulls. Points 1 through 8 indicate the occurrence of the first eight interference nulls. It may be noted that signal strength could alternatively be plotted as the function of some other quantity indicating position of transmitter 14, such as time. It may be further noted that the plot in FIG. 3 is valid only for a particular hypothesized refractive index profile, whereby signal strength is a function of both transmitter position and refractive index profile.

Referring to FIG. 4 there is shown vessel 22, wherein an observer may determine the refractive index profile within a radius of several hundred kilometers of the location of vessel 22 by a method comprising an embodiment of the present invention. Receiving means 24, which may comprise any suitable satellite signal receiver, such as the MTR-302 receiver manufactured by Government Electronics Division, Motorola Inc., is located at point 10 so that it is at a height $h_o$ above reflecting surface 12, which may comprise a sea surface. A suitable height $h_o$ may be 20 meters. Consequently, receiver 24 will receive a signal comprising the sum of direct signal ray 16 and reflected signal ray 18, the received signal being coupled into computer means 26 aboard vessel 22. A suitable frequency for the signal transmitted by satellite transmitter 14 may be 3 GHz, whereby the wavelength $\lambda$ of the signal is 10 centimeters.

According to a first step of the method for inferring a refractive index profile a signal pattern from transmitter 14 is observed over a period of several minutes by receiving the signal through receiving means 24 and coupling it into computing means 26. The received signal data may be represented by observed relative signal strength in decibels and satellite position may be represented by the values of satellite range obtained from known ephemeris data.

According to a second step of the method, computer means 26 calculates one or more hypothetical signal patterns, each hypothetical pattern being calculated by selecting a different hypothesized refractive index profile, according to the principle previously noted whereby signal strength is a function of both transmitter position and refractive index profile. To calculate the hypothetical signal pattern for a particular hypothesized refractive index profile, the numerical values of $\alpha_{i,o}$ for the first eight interference nulls are calculated by employing equations (1) and (2), previously referred to. The numerical values of $R_i$ may then be calculated for the first eight interference nulls by employing equations (3), (4) and (5), previously referred to. Computer means 26 may be provided with a storage means, wherein a large number of refractive index profiles may be stored so that computer means 26 may quickly select different hypothesized profiles for calculating different hypothetical signal patterns.

When a hypothetical signal pattern has been calculated, computer means 26 compares it with the observed signal pattern to determine how closely the hypothetical and observed signal patterns match. If they match to within a selected limit of error, it may be inferred that the hypothesized refractive index profile used to calculate the matching hypothetical pattern is the refractive index profile to be determined. If the hypothetical and observed patterns do not match to within a selected limit of error, another hypothetical pattern may be calculated and compared with the observed pattern.

To compare the observed signal pattern with a given hypothetical signal pattern computer means 26 may employ a least squares fit procedure wherein it is sought to minimize the function $F = \Sigma(R_i - R'_i)^2$, where $R_i$ is the calculated value of range of the $i^{th}$ interference null of a given hypothetical signal pattern, and $R'_i$ is the value of range of the $i^{th}$ interference null of the observed signal pattern obtained from ephemeris data.

Computer means 26 may comprise automatic data processing means, as for example, the NOVA 800, manufactured by Data General Corp., which may be readily programmed by any person of ordinary computer programming skill to perform the above stated calculations and comparisons.

Obviously many modifications and variations of the present invention are possible in the light of the above teachings. It is therefore to be understood that within the scope of the appended claims the invention may be practiced otherwise than as specifically described.

What is claimed is:

1. A method for determining the refractive index profile of the lower atmosphere comprising the steps of:
   (a) observing the signal pattern of a signal received from a satellite transmitter as the satellite moves through low elevation angles over a selected period of time;
   (b) calculating a number of hypothetical signal patterns;
   (c) comparing each of said hypothetical signal patterns with said observed signal pattern until one of said hypothetical signal patterns matches said observed signal pattern to within a selected limit of error, each of said hypothetical signal patterns is calculated by hypothesizing a different refractive index profile, the hypothesized refractive index profile of said matching hypothetical signal pattern comprising the refractive index profile to be determined.

2. The method of claim 1 wherein said observed pattern and each of said hypothetical patterns comprises a selected number of interference nulls.

3. The method of claim 2 wherein said received signal comprises the sum of a direct signal ray having a direct path length and a reflected signal ray having a reflected path length.

4. The method of claim 3 wherein each of said interference nulls of said observed signal pattern occurs at a particular value of difference between said direct path length and said reflected path length.

5. The method of claim 4 wherein each of said hypothetical signal patterns is calculated by calculating the value of the elevation angle of each interference null of the hypothetical signal pattern and by calculating the numerical value of position of each interference null of the hypothetical signal pattern.

6. The method of claim 5 wherein each of said hypothetical signal patterns is compared with said observed signal pattern by comparing the value of position of each interference null of the hypothetical signal pattern with the value of position of the same interference null of the observed signal pattern.

* * * * *